(12) United States Patent
Ellis et al.

(10) Patent No.: US 8,561,077 B1
(45) Date of Patent: Oct. 15, 2013

(54) BINDER FOR A MULTI-THREADED PROCESS TO ACCESS AN UN-SHAREABLE RESOURCE

(75) Inventors: Edric Ellis, Huntingdon (GB); Jos Martin, Burwell (GB)

(73) Assignee: The Math Works, Inc., Natick, MA (US)

( * ) Notice: Subject to any disclaimer, the term of this patent is extended or adjusted under 35 U.S.C. 154(b) by 1852 days.

(21) Appl. No.: 11/403,113

(22) Filed: Apr. 12, 2006

(51) Int. Cl.
*G06F 9/46* (2006.01)

(52) U.S. Cl.
USPC .......................................................... 718/104

(58) Field of Classification Search
None
See application file for complete search history.

(56) References Cited

U.S. PATENT DOCUMENTS

| | | | | |
|---|---|---|---|---|
| 5,630,136 | A * | 5/1997 | Davidson et al. | 718/106 |
| 6,459,706 | B1 * | 10/2002 | Hayasaka | 370/466 |
| 6,513,115 | B2 * | 1/2003 | Nock et al. | 713/100 |
| 6,993,769 | B2 * | 1/2006 | Simonson et al. | 719/311 |
| 8,250,131 | B1 * | 8/2012 | Pulsipher | 709/201 |

OTHER PUBLICATIONS

Mintchev et al. ("Towards Portable Message Passing in Java: Binding MPI", Recent Advances in Parallel Virtual Machine and Message Passing Interface, Lecture Notes in Computer Science, 1997, vol. 1332/1997, pp. 135-142).*

* cited by examiner

*Primary Examiner* — Jennifer To
*Assistant Examiner* — Eric C Wai
(74) *Attorney, Agent, or Firm* — Nelson Mullins Riley & Scarborough LLP

(57) ABSTRACT

The present invention allows a multi-threaded process to access an un-shareable resource without modifying the multi-threaded process. A binder is created for the multi-threaded process to access the un-shareable resource. All requests from the multi-threaded process to access the un-shareable resource are intercepted by the binder and the binder decides how to redirect or reformulate the requests to access the un-shareable resource. The present invention allows a process to dynamically bind to an interface at run time to establish communication channels among multiple concurrent computing resources in a concurrent computing environment. Hence, a user can choose to change to use a different interface during run time of the process without terminating the execution of the process.

14 Claims, 5 Drawing Sheets

BINDER FOR A MULTI-THREADED PROCESS TO ACCESS AN UN-SHAREABLE RESOURCE

TECHNICAL FIELD

The present application generally relates to a concurrent computing process and more specifically to a binder provided for a process to access a resource with an incompatible threading mechanism.

BACKGROUND OF THE INVENTION

MATLAB® is a product of The MathWorks, Inc. of Natick, Mass., which provides engineers, scientists, mathematicians, and educators across a diverse range of industries with an environment for technical computing applications. As a desktop application, MATLAB® allows scientists and engineers to interactively perform complex analysis and modeling in their familiar workstation environment. With many engineering and scientific problems requiring larger and more complex modeling, computations accordingly become more resource intensive and time-consuming. However, a single workstation can be limiting to the size of the problem that can be solved, because of the relationship of the computing power of the workstation to the computing power necessary to execute computing intensive iterative processing of complex problems in a reasonable time. For example, a simulation of a large complex aircraft model may take a reasonable time to run with a single computation with a specified set of parameters. However, the analysis of the problem may also require the model be computed multiple times with a different set of parameters, e.g., at one-hundred different altitude levels and fifty different aircraft weights, to understand the behavior of the model under varied conditions. This would require five-thousand computations to analyze the problem as desired and the single workstation would take an unreasonable or undesirable amount of time to perform these simulations. Therefore, it is desirable to perform a computation concurrently using multiple workstations when the computation becomes so large and complex that it cannot be completed in a reasonable amount of time on a single workstation.

Applications that are traditionally used as desktop applications, such as MATLAB®, need to be modified to be able to utilize the computing power of concurrent computing, such as parallel computing and distributed computing. Each machine or workstation needs to have its local copy of the application and between the different instances of the application, there needs to be a way to communicate and pass messages between the machines and workstations so that the multiple machines or workstations in the concurrent computing environment can collaborate with each other.

Message passing is a form of communication used in concurrent computing for different machines or workstations to communicate with each other in the concurrent computing environment. Communication is made by the sending of messages from one machine/workstation to another machine/workstation. Forms of messages include function invocation, signals, and data packets. One example of a message passing method that establishes a communication channel between machines or workstations is Message Passing Interface (MPI).

In conventional MPI implementations, the MPI implementations are statically linked against a specific application. If a user wishes to change to a different MPI implementation, the application needs to be recompiled before the different MPI implementation can be linked to the specific application. Argonne National Laboratory has developed MPICH2, an implementation of MPI, which allows a user to specify at a command line which MPI implementation the user wishes to use with an application prior to launching the application without recompiling the application. However, Argonne's MPICH2 like other conventional MPI implementations does not allow user to change MPI implementation after an application is launched without terminating the application.

Some MPI implementations only allows a specific single thread to make calls into the corresponding MPI library, hence software developers need to modify multi-threaded applications so that only a single thread make calls to the MPI library as the specific MPI implementation requires. Some MPI implementations allow multiple threads to make calls to corresponding library; however they do not allow simultaneous access to the library. Hence, if a multi-threaded application can originally make simultaneous calls to the same resource, the software developers would also need to modify the multi-threaded applications to avoid simultaneous access to the MPI library by multiple threads. These problems/modifications are cumbersome to the software developers of multi-threaded applications and the resultant multi-threaded applications are restricted to use only specific kind of MPI implementations, which is not always desirable for the end users of the multi-threaded applications, especially when custom MPI implementations have been designed to maximize certain performance of concurrent computing applications on specific hardware.

SUMMARY OF THE INVENTION

The present invention provides a system and method for a multi-threaded process to use the service of an un-shareable resource without modifying the multi-threaded process to fit the access requirements of the un-shareable resource. Un-shareable resource is used herein to refer to a resource that allows either only a specific thread to access the resource or multiple threads to access the resource but not simultaneously. The present invention also provides a system and method for a process to dynamically bind to an interface at run time to establish communication channels among multiple concurrent computing resources in a concurrent computing environment. Hence, a user can choose to change to use a different interface during run time of the process without terminating the execution of the process.

In one embodiment of the present invention, a method for a multi-threaded process to access an un-shareable resource is provided. The method includes the steps of receiving a plurality of requests from a plurality of threads of a multi-threaded process to access an un-shareable resource and selecting a first thread from the plurality of threads to service. The method also includes the steps of providing one or more input arguments of the first thread to the un-shareable resource using a function call and preventing the plurality of threads besides the first thread to access the un-shareable resource when the first thread is accessing the un-shareable resource. The method further includes the steps of receiving output data from the un-shareable resource in response to the function call and providing the output data to the first thread to return to the multi-threaded process.

In one aspect of the present invention, at least two of the plurality of requests are made simultaneously by two different threads of the multi-threaded process. In another aspect of the present invention, the un-shareable resource is a library of a message passing interface implementation. In still another aspect of the present invention, the un-shareable resource can only be directly accessed by a specific thread. In a further aspect of the present invention, the method further includes the steps of placing the plurality of threads in a queue and servicing the plurality of threads in a first in first out order from the queue. The plurality of requests from the plurality of threads may be made according to an application binary interface of the un-shareable resource. The method may further include the step of providing a second application binary interface that is identical to the application binary interface of the un-shareable resource, wherein the plurality of requests from the plurality of threads are received by the second application binary interface.

In another embodiment of the present invention, a method for generating a binder for a multi-threaded process to access an un-shareable resource is provided. The method includes the step of receiving a selection of an un-shareable resource. The method also includes the step of retrieving from a file regarding information of a plurality of function pointers of the un-shareable resource. The method further includes the step of automatically generating code including a plurality of methods for a plurality of threads from a multi-threaded process to make function calls to the plurality of function pointers of the un-shareable resource.

In one aspect of the present invention, the automatic generated code has the same interface as the plurality of function pointers. In another aspect of the present invention, the un-shareable resource is a message passing interface application. In still another aspect of the present invention, each of the plurality of function pointers points to a corresponding function in a library of the message passing interface application.

In yet another embodiment of the present invention, a method for changing an interface during execution of a process is provided. The method includes the steps of receiving a selection of a first interface for communicating among a plurality of concurrent computing resources in a concurrent computing environment and launching a process in the concurrent computing environment. The method also includes the step of using the first interface to set up a first plurality of communication channels among the plurality of concurrent computing resources. The method further includes the steps of terminating the use of the first interface after the process is launched without terminating the execution of the process and receiving a selection of a second interface for communicating among the plurality of concurrent computing resources. The method also includes the step of using the second interface to set up a second plurality of communication channels among the plurality of concurrent resources.

In one aspect of the present invention, the first and second interfaces are two different implementations of a message passing interface. In a further aspect of the present invention, the method further includes the step of providing a binder for the process to access the first interface, wherein the binder has a first application binary interface that is identical to an application binary interface of the first interface and wherein the binder is automatically generated based on a plurality of function pointers extracted from a file of the first interface. In another aspect of the present invention, the method further includes the step of modifying the binder to point to the second interface so that the second interface is used instead of the first interface.

In still another embodiment of the present invention, a system for a multi-threaded process to access an un-shareable resource is provided. The system includes a binder for the multi-threaded process to access the un-shareable resource, the binder receiving a plurality of requests from a plurality of threads from the multi-threaded process and selecting a first thread from the plurality of threads to service, wherein the binder further provide one or more input arguments of the first thread to the un-shareable resource using a function call and preventing the plurality of threads besides the first thread to access the un-shareable resource while the first thread is accessing the un-shareable resource.

In yet another embodiment of the present invention, a system for a multi-threaded process to access an un-shareable resource is provided. The system includes a binder generator for generating a binder for the multi-threaded process to access the un-shareable resource, the binder generator receives a selection of an un-shareable resource and extracting a plurality of function pointers from a file of the un-shareable resource so that the binder can include methods for a plurality of threads from the multi-threaded process, wherein the methods make function calls to the plurality of function pointers.

In still another embodiment of the present invention, a system for a process to dynamically bind to an interface for communicating among a plurality of concurrent computing resources in a concurrent computing environment is provided. The system includes a binder for dynamically binding to an interface at run time; the binder is dynamically generated for a process to use the interface to set up a plurality of communication channels among the plurality of concurrent computing resources. In one aspect of the present invention, the binder dynamically binds to the interface at run time by using dynamic library access routines.

In yet another embodiment of the present invention, a computer-readable medium holding computer-executable instructions for causing a multi-threaded process on a computing device to access an un-shareable resource is provided. The instructions include the instructions for receiving a plurality of requests from a plurality of threads of a multi-threaded process to access an un-shareable resource and selecting a first thread from the plurality of threads to service. The medium also includes the instructions for providing one or more input arguments of the first thread to the un-shareable resource using a function call and preventing the plurality of threads besides the first thread to access the un-shareable resource when the first thread is accessing the un-shareable resource. The medium further includes the instructions for receiving output data from the un-shareable resource in response to the function call and providing the output data to the first thread to return to the multi-threaded process.

In still another embodiment of the present invention, a computer-readable medium holding computer-executable instructions for causing a computing device to generate a binder for a multi-threaded process to access an un-shareable resource is provided. The instructions include the instructions for receiving a selection of an un-shareable resource and retrieving from a file regarding information of a plurality of function pointers of the un-shareable resource. The medium further includes the instruction for automatically generating code including a plurality of methods for a plurality of threads from a multi-threaded process to make function calls to the plurality of function pointers of the un-shareable resource.

In yet another embodiment of the present invention, a computer-readable medium holding computer-executable instructions for causing a computing device to change an interface during execution of a process is provided. The instructions include the instructions for receiving a selection of a first interface for communicating among a plurality of concurrent computing resources in a concurrent computing environment and launching a process in the concurrent computing environment. The medium further includes the instructions for using the first interface to set up a first plurality of communication channels among the plurality of concurrent computing resources and terminating the use of the first interface after the process is launched without terminating the execution of the process. The medium further includes the instructions for receiving a selection of a second interface for communicating among the plurality of concurrent computing resources and using the second interface to set up a second plurality of communication channels among the plurality of concurrent resources.

In still another embodiment of the present invention, a method for a computing device to distribute to a remote computing device a plurality of instructions is provided. The method includes receiving a request from the remote computing device for the plurality of instructions. The plurality of instructions comprising the instructions for receiving a plurality of requests from a plurality of threads of a multi-threaded process to access an un-shareable resource; selecting a first thread from the plurality of threads to service; providing one or more input arguments of the first thread to the un-shareable resource using a function call; preventing the plurality of threads besides the first thread to access the un-shareable resource when the first thread is accessing the un-shareable resource; receiving output data from the un-shareable resource in response to the function call; and providing the output data to the first thread to return to the multi-threaded process. The method also includes forwarding the plurality of instructions to the remote computing device. In one aspect of the present invention, the computing device is a server. The remote computing device can be, but not limited to, a client or a node on a network, such as the Internet.

BRIEF DESCRIPTION OF THE FIGURES

The foregoing and other objects, aspects, features, and advantages of the invention will become more apparent and may be better understood by referring to the following description taken in conjunction with the accompanying drawings, in which.

DETAILED DESCRIPTION

The present invention provides a system and method for a multi-threaded process to use the service of an un-shareable resource without modifying the multi-threaded process to fit the access requirements of the un-shareable resource. A binder is created for the multi-threaded process to access the un-shareable resource. The binder may have an application binary interface that is identical to the one provided by the un-shareable resource. Hence, the multi-threaded process can make requests to access the un-shareable resource using multiple threads as if the un-shareable resource could handle such requests and the binder will intercept these requests from the multiple threads of the multi-threaded process and service these requests in a manner that is according to how the un-shareable resource can be accessed. For example, if the un-shareable resource can only allow a single thread to access itself at any given time, then the binder will only feed to the un-shareable resource a single thread at any given time. The binder can be dynamically generated at run time of the multi-threaded process based on the specific chosen un-shareable resource. Hence, if there are different implementations of the same un-shareable resource, a user can have the option to choose which implementation to use with the multi-threaded process. The user can further modify his/her selection of the specific implementation of the un-shareable resource during run time of the multi-threaded process and the binder would points to the newly selected implementation to allow the user to use the newly selected implementation of the un-shareable resource.

The following illustrative embodiments will be described for illustrative purposes relative to a MATLAB®-based technical computing environment. Although the illustrative embodiment will be described relative to a MATLAB®-based application, one of ordinary, skill in the art will appreciate that the present invention may be applied to parallel or distributed processing of technical or non-technical computing tasks with other technical or non-technical computing environments. Examples of technical computing environments that are suitable to practice with the present invention include ones from software products of LabVIEW® or MATRIXx from National Instruments, Inc., or Mathematica® from Wolfram Research, Inc., or Mathcad of Mathsoft Engineering & Education Inc., or Maple™ from Maplesoft, a division of Waterloo Maple Inc.

Figure 1:
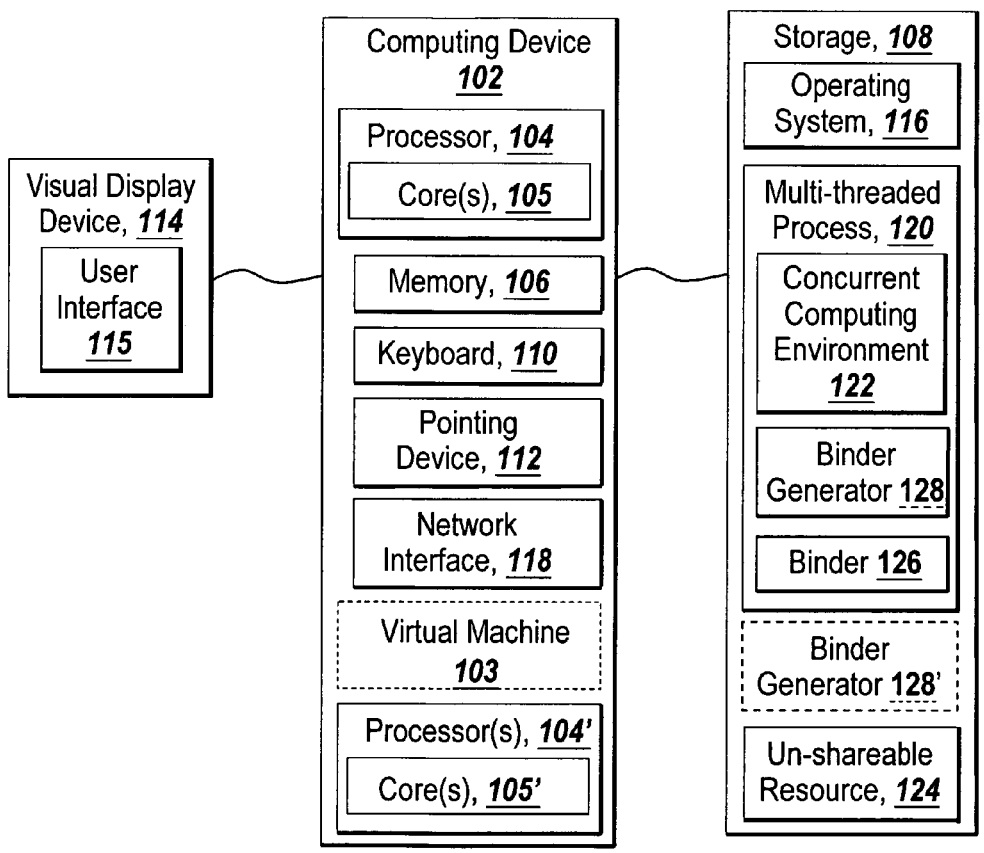
FIG. 1 is a block diagram of a computing device suitable for practicing an embodiment of the present invention.

FIG. 1 depicts an environment suitable for practicing an illustrative embodiment of the present invention. The environment includes a computing device 102 having memory 106, on which software according to one embodiment of the present invention may be stored, processor 104, and optionally, one or more processor(s) 104' for executing software stored in the memory 106, and other programs for controlling system hardware. Processor 104 and processor(s) 104' can each be a single or multiple core (105 and 105') processor. Virtualization can be employed in computing device 102 so that infrastructure and resources in the computing device can be shared dynamically. Virtualized processors may also be used with multi-threaded process 120 and other software in storage 108. A virtual machine 103 can be provided to handle a process running on multiple processors so that the process appears to be using only one computing resource rather than multiple. Multiple virtual machines can also be used with one processor. Other computing resources, such as FPGA, ASIC, DSP, and GPP, may also be used for executing code and/or software. A hardware accelerator can additionally be used to speed up the general processing rate of the computing device 102.

The memory 106 may comprise a computer system memory or random access memory such as DRAM, SRAM, EDO RAM, etc. The memory 106 may comprise other types of memory as well, or combinations thereof. A user may interact with the computing device 102 through a visual display device 114 such as a computer monitor, which may include a user interface 115. The computing device 102 may include other I/O devices such a keyboard 110 and a pointing device 112, for example a mouse, for receiving input from a user. Optionally, the keyboard 110 and the pointing device 112 may be connected to the visual display device 114. The computing device 102 may include other suitable conventional I/O peripherals. The computing device 102 may further comprise a storage device 108, such as a hard-drive, CD-ROM, or other computer readable media, for storing an operating system 116 and other related software, and for storing binder 126, un-shareable resource 124, and multi-threaded process 120, such as parallel computing with MATLAB® or distributed computing with MATLAB®. Un-shareable resource 124 and multi-threaded process 120 can each be, but is not limited to, an application, a program, a module, an interface, or a script. Un-shareable resource is used herein to refer to a resource that allows either only a specific thread to access the resource or multiple threads to access the resource but not simultaneously. Additionally, the word "access" is used herein to mean direct access, such as a function call, or indirect access, such as invoking another thread or another function, to obtain data and information from the un-shareable resource.

Multi-threaded process 120 may be running a concurrent computing environment 122 to enable concurrent computing on the computing device 102. The multi-threaded process 120 can also include a binder generator 128 for generating a binder 126 at compile time of the multi-threaded process 120 to access the un-shareable resource 124. One of ordinary skill in the art will appreciate that binder generator 128 can be adapted to be included as part of the multi-threaded process 120, or it can be a stand-alone application/module/script/program that responds to calls from the multi-threaded process 120, such as binder generator 128'. Binder generator 128 can generate a binder 126 that has an identical application binary interface with that from the un-shareable resource 124. Additionally, the operating system 116 and multi-threaded process 120 can be run from a computer readable media, such as, for example, KNOPPIX®, a bootable CD for GNU/Linux.

Additionally, the computing device 102 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25), broadband connections (e.g., ISDN, Frame Relay, ATM), wireless connections, or some combination of any or all of the above. The network interface 118 may comprise a built-in network adapter, network interface card, PCMCIA network card, card bus network adapter, wireless network adapter, USB network adapter, modem or any other device suitable for interfacing the computing device 102 to any type of network capable of communication and performing the operations described herein. Moreover, the computing device 102 may be any computer system such as a workstation, desktop computer, server, laptop, handheld computer or other form of computing or telecommunications device that is capable of communication and that has sufficient processor power and memory capacity to perform the operations described herein.

The computing device 102 can be running any operating system such as any of the versions of the Microsoft® Windows® operating systems, the different releases of the Unix and Linux operating systems, any version of the MacOS® for Macintosh computers, any embedded operating system, any real-time operating system, any open source operating system, any proprietary operating system, any operating systems for mobile computing devices, or any other operating system capable of running on the computing device and performing the operations described herein.

Figure 2:
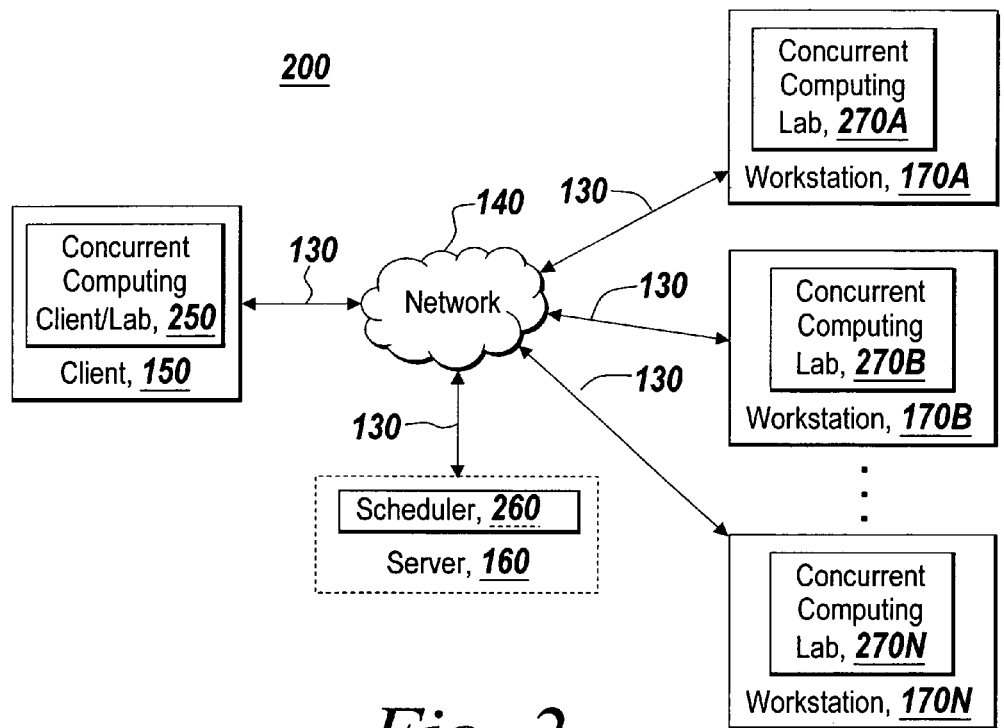
FIG. 2 a block diagram of a concurrent computing system including more than one computing device for practicing an embodiment of the present invention.

FIG. 2 depicts a concurrent computing system 200 that is suitable for practicing the illustrative embodiment of the present invention. In brief overview, the system 200 comprises a concurrent computing client 250 running on a client 150, concurrent computing labs 270A-N on workstations 170A-N, and optionally a server 160. A concurrent computing lab is a computing resource that performs distributed computing or parallel computing. A lab is a computing resource, such as a processor, a computer system, or other hardware with computational capabilities. The concurrent computing client 250 is in communication with the concurrent computing labs 170A-N and server 160 through network communication channels 130 over a network 140. One of ordinary skill in the art will appreciate that workstations 170A-N, server 160, and client 150 may have one or more concurrent computing lab. Each concurrent computing lab is an instance of the multi-threaded process 120.

The concurrent computing client 250 can be a technical or non-technical computing software application. Concurrent computing client 150 may provide a technical computing and/or graphical modeling environment for generating block diagram models and to define mathematical algorithms for simulating models. The concurrent computing client 250 may include all or a portion of the functionality provided by the stand-alone desktop application of MATLAB®. Additionally, the concurrent computing client 250 can be any of the software programs available in the MATLAB® product family. Furthermore, the concurrent computing client 250 can be a custom software program or other software that accesses functionalities of software programs in the MATLAB® product family via an interface, such as an application programming interface, or by other means. One of ordinarily skill in the art will appreciate the various combinations of client types may access the functionalities of the system.

In one embodiment of the present invention, concurrent computing client 250 is also a concurrent computing lab. In such a configuration, communication channels are setup among all the concurrent computing labs (concurrent computing client 250 and concurrent computing labs 270A-N). Each of the concurrent computing labs (including the concurrent computing client 250) has its local copy of a computer program that is executed in the corresponding concurrent computing labs, so there is no main concurrent computing lab that distributes executions to the other concurrent computing labs. The concurrent computing client 250 will additionally have the functionality to accept inputs and/or commands from a user related to the computer program using a tool such as an Integrated Development Environment (IDE). The concurrent computing client 250 and concurrent computing labs 270A-N can be configured to perform distributed computing or parallel computing.

In one embodiment of the present invention, functions can be defined, by the concurrent computing client 250 with an application programming interface (API) and/or programming language, representing a technical computing task to be executed by either a technical computing environment local to the client 150, or remote on the workstations 270A-N. Tasks can be declared on a concurrent computing client 250 and additionally organized into jobs. A job is a logical unit of activities, or tasks that are processed and/or managed collectively. A task defines a technical computing command, such as a MATLAB® command, to be executed, and the number of arguments and any input data to the arguments. A job is a group of one or more tasks.

In one aspect of the present invention, a task can be directly distributed by the concurrent computing client 250 to one or more computing resources, such as workstations 170A-N. A computing resource performs technical computing on a task and may return a result to the concurrent computing client 250.

In another aspect of the present invention, the system includes a server 160 on which runs a scheduler 260. The scheduler 260 can be a scheduler provided with multi-threaded process 120, a generic scheduler, or a third-party scheduler that is designed and provided a company or individual that does not provide multi-threaded process 120. For example, given that multi-threaded process 120 is parallel computing with MATLAB® by The MathWorks, Inc. of Natick, Mass., a third-party scheduler can be MPI Exec, LSF, Condor, Microsoft Compute Cluster Server, or PBS. The server 160 communicates over a network communication channel 130 on the network 140 to the workstations 170A-N. One of ordinary skill in the art will appreciate that any of the workstations 170A-N may include more than one technical computing lab to practice the present invention. Additionally, client 150 and server 160 may also include one or more concurrent computing labs.

The scheduler 260 comprises one or more application software components to provide for the automatic distribution of tasks from the concurrent computing client 250 to one or more of the concurrent computing labs 270A-N. The scheduler 260 allows the concurrent computing client 250 to delegate the management of task distribution to the scheduler 260. The scheduler may also set up for concurrent computing client 250 the concurrent computing labs 270A-N by using the information received from the concurrent computing client 250 regarding the number of concurrent computing labs needed and other configuration information. Hence, the concurrent computing client 250 does not need to know the specifics of the concurrent computing labs 270A-N. The concurrent computing client 250 can define a function to submit the task to the scheduler 260, and get a result of the execution of the task. As such, the scheduler 260 provides a level of indirection between the concurrent computing client 250 and the concurrent computing labs 270A-N.

This eases the distributed programming and integration burden on the concurrent computing client 250. The concurrent computing client 250 does not need to have prior knowledge of the availability of the workstations 170A-N. For multiple task submissions from the concurrent computing client 250, the scheduler 260 can manage and handle the delegations of the tasks to the concurrent computing labs 270A-N and hold the results of the tasks on behalf of the concurrent computing client 250 for retrieval after the completion of technical computing of all the tasks distributed by concurrent computing client 250. In an alternative implementation, the concurrent computing labs 270A-N may provide concurrent computing client 250 directly the results of the tasks assigned to concurrent computing labs 270A-N by the scheduler 260. The scheduler 260 can further include an object-oriented interface to provide control of delegating tasks and obtaining results in the system 200. The scheduler 260 also provides an interface for managing a group of tasks collectively as a single unit called a job, and on behalf of a concurrent computing client 250, submitting those tasks making up the job, and obtaining the results of each of the tasks until the job is completed. One of ordinarily skill in the art will recognize the functions and operations of the scheduler 260 can be separated into various software components, applications and interfaces. Additionally, the functions and operations of the scheduler 260 may reside on either the concurrent computing client 250 or one of the concurrent computing labs 270A-N instead of the server 160.

Additionally, each of the client 150, the server 160, and the workstations 170A-N can be running the same or different operating systems with the same or different processors. For example, the client 150 can be running Microsoft® Windows®; the server 160 can be running a version of Unix, and the workstations 170A-N a version of Linux. Alternatively, each of the client 150, the server 160 and the workstations 170A-N can be running Microsoft® Windows®. One of ordinarily skill in the art will recognize the various combinations of operating systems and processors that can be running on any of the computing devices (client 150, server 160, workstations 170A-N).

Figure 3:
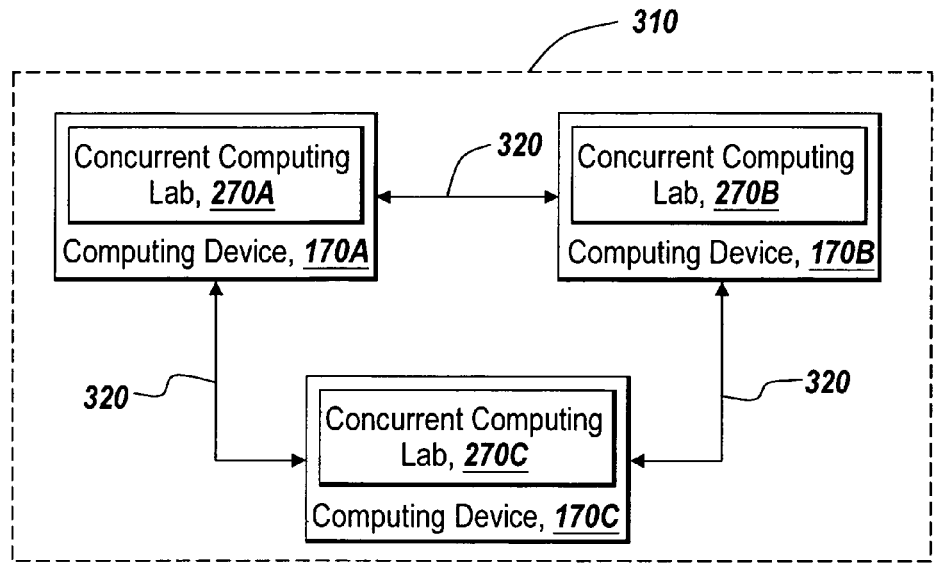
FIG. 3 a block diagram illustrating a collaboration of concurrent computing labs in the illustrative embodiment of the present invention.

FIG. 3 illustrates a collaboration of the concurrent computing labs 270A, 270B, and 270C. The concurrent computing labs 270A, 270B, and 270C establish a communication channel 320 and form a collaboration 310. The concurrent computing labs 270A, 270B, and 270C may communicate via a MPI communication channel 320.

In other embodiments, the concurrent computing labs 270A, 270B, and 270C can interface via socket based communications over TCP/IP implementing a custom message specification. In further embodiments, the concurrent computing labs 270A, 270B, and 270C may communicate using any available messaging communications products and/or custom solutions that allow the sending and receiving of messages among the concurrent computing labs 270A, 270B, and 270C. In certain embodiments, the communication channel 320 may include a file interfacing mechanism such as reading and writing to files on a network accessible directory or common file system. Furthermore, the concurrent computing labs 270A, 270B, and 270C can each be waiting or listening for messages from other concurrent computing labs 270A, 270B, and 270C. One of ordinary skill in the art will recognize the various types of interfaces to communicate messages among the concurrent computing labs 270A, 270B, and 270C.

In one embodiment of the present invention, the collaboration is dynamic. In other words, a user can modify or change the size of the collaboration by adding another computing resource. The user may be provided on the client 150 with a user interface to modify or change the size of the collaboration or designate a specific resource to add or remove from the collaboration. In another embodiment of the present invention, the client 150 can forward the information to the scheduler 260, which will determine a concurrent computing lab to be added or removed from the collaboration.

Figure 4:
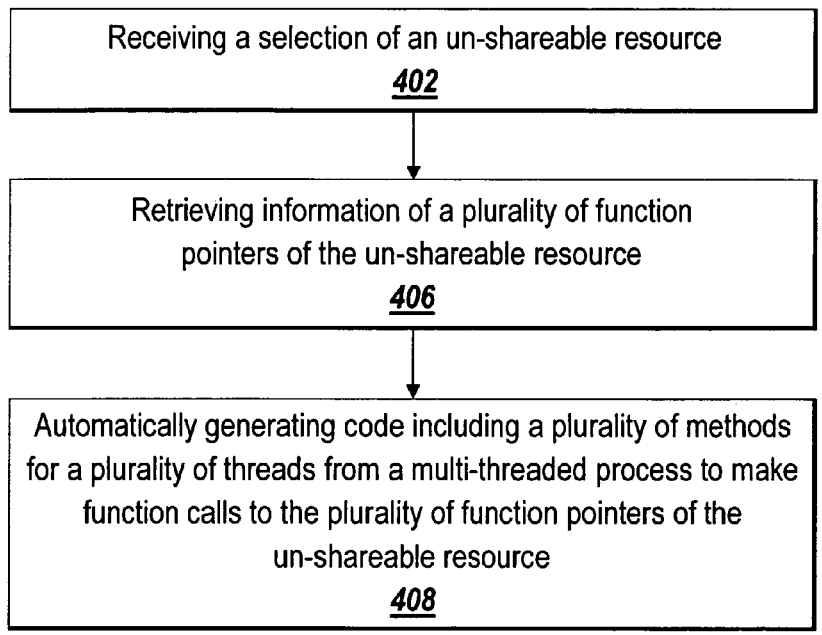
FIG. 4 illustrates a flowchart depicting steps taken to generate a binder according to one embodiment of the present invention.

FIG. 4 shows the steps taken to generate a binder for the multi-threaded process 120 to access the un-shareable resource 124 according to one embodiment of the present invention. In step 402, binder generator 128 receives a selection of an un-shareable resource 124 that the multi-threaded process 120 wants to access. In step 406, the binder generator 128 retrieves information on a plurality of function pointers of the un-shareable resource. In one embodiment of the present invention, the information can be retrieved from a file. The file may be a C/C++ header file. In step 408, the binder generator 128 automatically generates code including methods for a plurality of threads from the multi-threaded application 120 to make function calls to the plurality of function pointers of the single-threaded application. The generated code forms a binder that can have an identical application binary interface to the one that is provided by the un-shareable resource 124. In one embodiment of the present invention, the binder is generated during compile-time of the multi-threaded process 120.

To better illustrate the present invention, the following is an example of how a binder can be generated for MATLAB® (a multi-threaded process) from MathWorks, Inc. of Natick, Mass. to access a library of an MPI implementation (generally an un-shareable resource, and is assumed here as an un-shareable resource for illustrated purpose). Binder generator 128 can be an add-on or plug-in tool of MATLAB®. Binder generator 128 can generate a binder 126 during compile-time of MATLAB® once a specific MPI implementation is selected. Using the mpi.h header file from the specific MPI implementation, function pointers can be interpreted. The mpi.h header file has definitions of MPI methods that MATLAB® can make calls or requests to the library of the MPI implementation. Function pointers can be extracted using dlsym function calls at run time. Binder generator 128 can automatically generate code using the information on the function pointers deduced from the mpi.h header file. The generated code is preferably to have an identical application binary interface to the one provided by the specific MPI implementation so that MATLAB® does not need to be aware of the specific type of MPI implementation that is used. In other words, MATLAB® does not need to be modified to use a specific MPI implementation or restricted to use a specific kind of MPI implementation. Hence, the binder 126 can intercept calls from MATLAB® to the MPI implementation and redirect or reformulate the calls such that the call will be acceptable to the specific MPI implementation.

For example, in the mpi.h header file, there can be a line that looks like the following:

int MPI_Comm_rank (MPI_Comm comm., int*rank);

which defines the binary interface of the MPI_Comm_rank function which will be contained in any MPI implementation that follows the MPI standard. Binder generator 128 reads this line and generates a line of code declaring a function pointer like the following:

int (*fMPI_Comm_rank) (MPI_Comm, int*);

where fMPI_Comm_rank is the name of the function pointer. The binder generator will also generate code like the following that presents the same ABI to MATLAB® as the original MPI implementation:

int MPI_Comm_rank(MPI_Comm comm., int*rank)
{
//push the request involving the input arguments
//and the function pointer fMPI_Comm_rank onto
//the stack of requests, and wait for return.
}

In other words, the binder 126 exposes the function MPI_Comm_rank with the same binary interface as the original MPI implementation. At run-time of MATLAB®, the function pointer is populated from the MPI implementation like the following:

fMPI_Comm_rank=(int(*)(MPI_Comm, int*)) dlsym (libHandle, "MPI_Comm_rank"); - - - (1)

where libHandle is a handle to the MPI implementation, and dlsym is a standard function to extract a function pointer at run time. Line (1) is re-executed if the user selects a different MPI implementation at run-time of MATLAB® so that the binder 126 can point to the newly selected MPI implementation and use the functions and libraries in the newly selected MPI implementation. If the newly selected MPI implementation has a different ABI, then a new binder needs to be generated before the newly selected MPI implementation can be used. This usually requires that MATLAB® be recompiled to generate the new binder.

The underlying MATLAB® code does not need to be modified to satisfy the access rules/properties of the specific selected MPI implementation. The generated code includes methods that MATLAB® can make calls and requests to and the binder 126 will redirect the calls using the function pointers and/or reformulate the calls according to the access rules/properties of the specific MPI implementation. The generated code enables the binder 126 to handle calls from multiple threads, even if they are made simultaneously. The binder 126, however, will only allow a specific thread or one thread at a time to access the library of the MPI implementation, as that is how the MPI implementation can function. For example, assuming a specific MPI implementation has a routine called MPI_Comm_size, which returns the number of processes in the concurrent computing collaboration that use the specific MPI implementation as the means to setup a communication channel among the concurrent computing labs in the collaboration. Binder 126 can then generate a new routine called MPI_Comm_size that would accept calls and requests from MATLAB®. In other words, the calls to MPI_Comm_size from MATLAB® would be linked to the MPI_Comm_size function generated in the binder. The binder will then make calls to the MPI_Comm_size function in the library of the specific MPI implementation following the access rules/properties of the specific MPI implementation. In one embodiment of the present invention, the binder 126 can itself be a shared library file.

Hence, the binder 126 avoids software developers to modify MATLAB® to fit a specific kind of MPI implementation without knowing which implementation different users would prefer to use. Hence, the present invention also has the advantage that a user is free to choose a specific MPI implementation to use, even if it is an un-shareable resource and does not allow multiple threads to access the library or does not allow simultaneous access by different threads.

Figure 5:
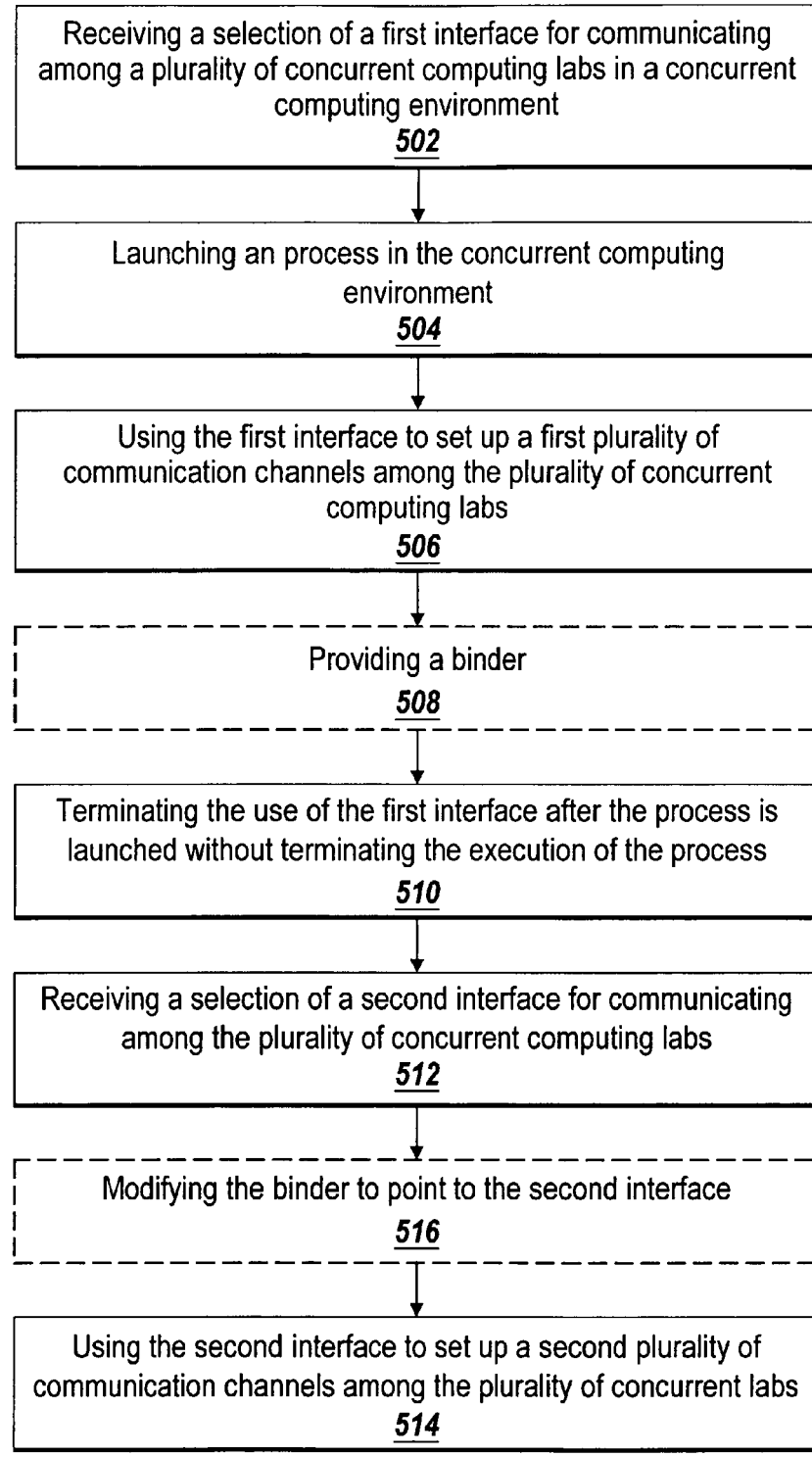
FIG. 5 illustrates a flowchart depicting steps taken to change a communication interface during execution of a process according to one embodiment of the present invention.

FIG. 5 shows the steps taken to change a communication interface during execution of a process. In step 502, a selection of a first interface is received for communicating among multiple concurrent computing labs in a concurrent computing environment. In step 504, a process is launched in the concurrent computing environment and the first interface is used to set up multiple communication channels among the concurrent computing labs in step 506. In step 508, a binder is optionally provided for the process to properly access the first interface according to the access rules/properties of the first interface. In step 510, the use of the first interface is terminated after the process is launched and the termination of the use of the first interface does not terminate the execution of the process. In step 512, a selection of a second interface is received for communicating among the concurrent computing labs. In step 516, the binder is modified to point to the second interface so that the second interface is used instead of the first interface. In step 514, the second interface is used to set up new communication channels among the plurality of concurrent computing labs.

Hence, using MATLAB® as an example, a user has the option to change to a different MPI implementation during execution of MATLAB®. Traditionally, such a change requires the MATLAB® session to terminate before a user can switch to a different MPI implementation. A binder is generated during compile time of MATLAB®, however the binder can be modified to point to any selected MPI implementation and the selected MPI implementation is dynamically binded at run time. In other words, the present invention allows runtime binding of a particular MPI implementation to a process or application. A user can choose to use MATLAB® with a first MPI implementation to create the communication channels with concurrent computing labs in the concurrent computing environment. When such a selection is done, a binder 126 is modified at run time to point to the selected MPI implementation and allow MATLAB® to dynamically "link" to the selected MPI implementation at run time. The binder 126 redirects calls from MATLAB® to the first MPI implementation. The linking between the binder 126 and the first MPI implementation is dynamic. The binder 126 can access the functions in the first MPI implementation without explicit binding; instead it uses runtime dynamic library access routines to access the functions within the library of the first MPI implementation. Since the binding between the binder 126 and the library of the first MPI implementation is dynamic, then it is easy for a user to switch to another MPI implementation. When a user wants to change to a second MPI implementation, the use of the first WI implementation is terminated without terminating the execution of MATLAB®. Then, the second MPI implementation is used to set up new communication channels among the concurrent computing labs in the concurrent computing environment. The binder 126 is modified to point to the second MPI implementation and then dynamically linked to the second MPI implementation using runtime dynamic library access routines to dynamically access functions in the library of the second MPI implementation. Requests from MATLAB® to access the library of the second MPI implementation is intercepted by the binder and the binder redirects the requests to the second MPI implementation. Changing MPI implementation during execution of an application, such as MATLAB® is not trivial because typically the application is linked against the static MPI library or shared MPI library. If the application is linked against the static MPI library, the application must be recompiled before using a different MPI implementation. Alternatively, if the application is linked against a shared MPI library, then in order to use a different MPI implementation, the shared MPI library needs to be substituted or LD_LIBRARY_ PATH needs to be modified to make the operating system to use a different library. Hence, it is not obvious that the MPI implementation can be changed during execution of an application.

Figure 6:
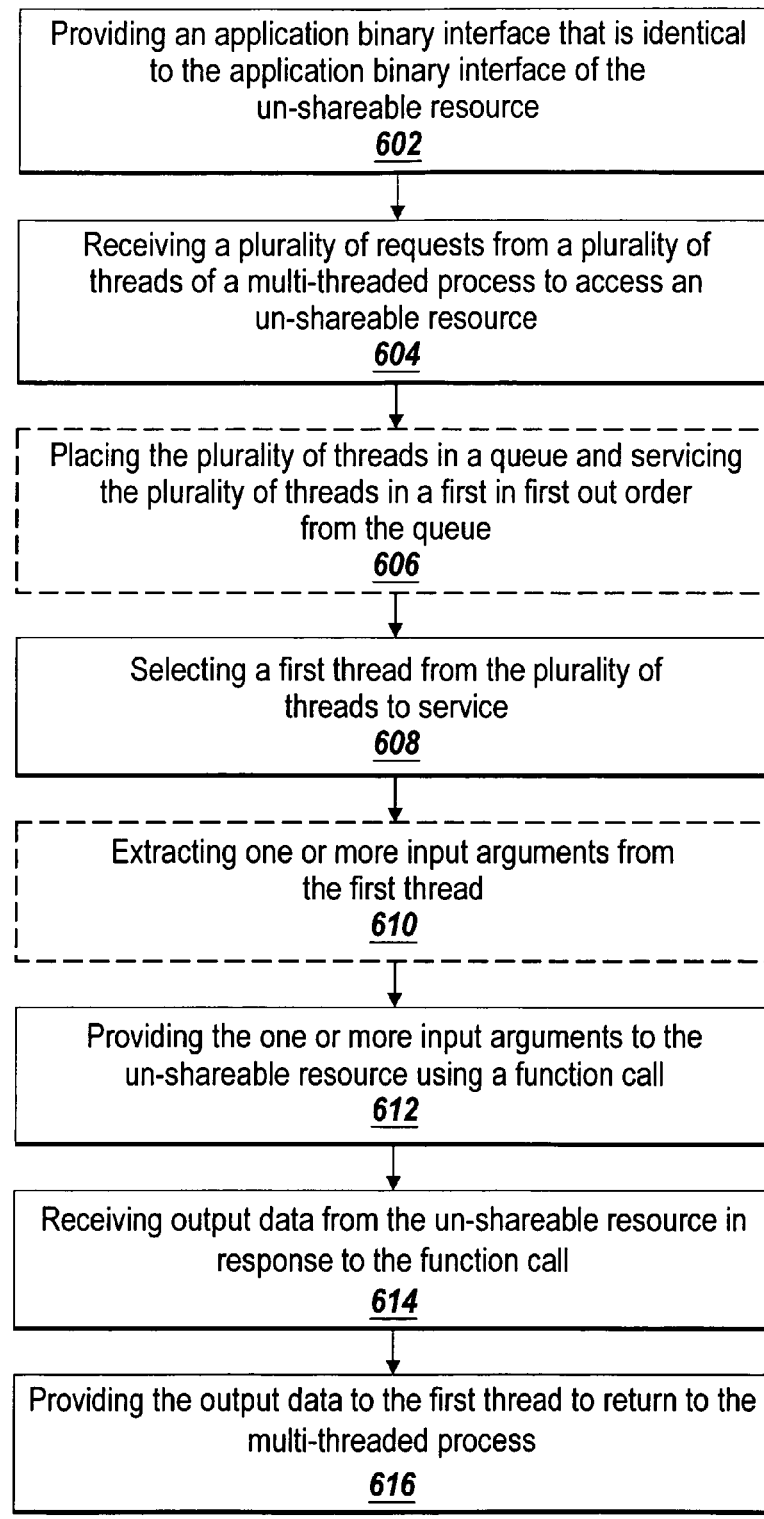
FIG. 6 illustrates a flowchart depicting steps taken by a binder according to one embodiment of the present invention.

FIG. 6 shows a flowchart depicting steps taken by a binder 126 to transfer calls from a multi-threaded process 120 to an un-shareable resource 124 according to one embodiment of the present invention. In step 602, the binder 126 can optionally provide an application binary interface that is identical to the one provided by the un-shareable resource 124. In step 604, the binder 126 receives multiple requests from multiple threads of the multi-threaded process 120 to access the un-shareable resource 124. Since the un-shareable resource 124 cannot be accessed by two threads simultaneously, then a mutual exclusion mechanism needs to be employed to ensure that only one thread is accessing the un-shareable resource 124, regardless that one thread is always the same thread or different thread. In one embodiment of the present invention, the binder 126 may use a queue as shown in step 606 as the mutual exclusive mechanism. In step 606, the binder 126 places the multiple threads in a queue and services them in a first in first out order from the queue. Alternatively, a flag or a lock can be implemented to indicate if a thread is allowed to access an un-shareable resource. One of ordinary skill in the art will appreciate that there are many algorithms, such as Dekker's algorithm, Peterson's algorithm, and Lamport's bakery algorithm, to implement the mutual exclusion mechanism and the methods listed herein should not be used to limit the present invention.

In step 608, a first thread from the multiple threads is selected to be serviced. The binder 126 may optionally extract one or more input arguments from the first thread in step 610 if the first thread is not allowed to directly access the un-shareable resource. The binder 126 provides the one or more input arguments to the un-shareable resource 124 using a function call in step 612. The binder 126 then receives in step 614 output data from the un-shareable resource in response to the function call. The binder 126 provides the output data to the first thread to return to the multi-threaded process 120 in step 616.

In one embodiment of the present invention, the un-shareable resource 124 can allow multiple threads to access but not simultaneously. Hence, the binder 126 only needs to make sure to let one thread at a time to access the un-shareable resource 124. The binder 126 does not necessarily need to create new threads or make new function calls to access the un-shareable resource 124. If a thread wants to access the un-shareable resource 124 while another thread is already accessing the un-shareable resource 124, the binder 126 can make the thread to wait a few clock cycles before checking the availability to access the un-shareable resource 124.

In another embodiment of the present invention, the un-shareable resource 124 only allows a specific thread to access the resource. Hence, the binder 126 needs to extract input arguments from each of the threads from the multi-threaded process 120 and provide the input arguments to the specific thread to access the un-shareable resource 124.

Using MATLAB® with a singled-threaded MPI implementation as an example, a binder 126 can be used to access the library of the single-threaded MPI implementation. The binder 126 receives multiple requests from multiple threads of MATLAB® to access the library of the single-threaded MPI implementation. The binder 126 will select one thread at a time to service and access the library of the single-threaded MPI implementation on behalf of the selected thread. The binder 126 can choose to use any algorithm to decide which thread to pick. For example, the binder 126 can decide to put all the threads that are making calls to the library into a data structure, such as a queue, and use a first in first out order or other type of order to determine which thread to service first. Alternatively, binder 126 can also service the threads based on time stamp of the calls, and/or the priority of the threads. One of ordinary skill in the art will appreciate that there are many ways one can choose how the binder will select the threads for service. Once a thread is selected, binder 126 will extract one or more input arguments from the thread and feed them to the library of MPI implementation following the access rules/properties of the library. For example, if the MPI implementation requires that only a specific thread can access the library, then the binder 126 will use the specific thread to provide the input arguments and access the library. The MPI implementation receives the input arguments to perform the requested computations and provides output data back to the binder 126. The binder 126 then receives the output data from the library and provides them to the selected thread which will return the output data to MATLAB®.

Many alterations and modifications may be made by those having ordinary skill in the art without departing from the spirit and scope of the invention. Therefore, it must be expressly understood that the illustrated embodiments have been shown only for the purposes of example and should not be taken as limiting the invention, which is defined by the following claims. These claims are to be read as including what they set forth literally and also those equivalent elements which are insubstantially different, even though not identical in other respects to what is shown and described in the above illustrations.

We claim:

1. A computer-implemented method for a multi-threaded process to access an un-shareable resource, the method comprising:
   creating, using a computing device and at compile time of the multi-threaded process, a binder for the multi-threaded process to access the un-shareable resource such that the binder includes an interface;
   linking, using the computing device, the interface of the binder to the un-shareable resource at runtime;
   at the interface of the binder,
      receiving, using the computing device, a plurality of requests from a plurality of threads of the multi-threaded process to access the un-shareable resource, wherein the plurality of requests from the plurality of threads are made according to an application binary interface of the un-shareable resource;

selecting, using the computing device, a first thread from the plurality of threads to service using the binder;

providing, using the computing device, one or more input arguments of the first thread to the un-shareable resource using a function call;

preventing, using the computing device, the plurality of threads besides the first thread from accessing the un-shareable resource when the first thread is accessing the un-shareable resource; and providing, using the computing device, a second application binary interface that is identical to the application binary interface of the un-shareable resource, wherein the plurality of requests from the plurality of threads are received by the second application binary interface.

2. The method of claim 1, wherein at least two of the plurality of requests are made simultaneously by two different threads of the multi-threaded process.

3. The method of claim 1, wherein the un-shareable resource is a library of a message passing interface (MPI) implementation.

4. The method of claim 1, wherein the un-shareable resource can only be directly accessed by a specific thread.

5. The method of claim 1 further comprising:
placing, using the computing device, the plurality of threads in a queue; and
servicing, using the computing device, the plurality of threads in a first in first out order from the queue using the binder.

6. A computer-implemented method for changing an interface during execution of a process, said method comprising:
receiving, using a computing device, a selection of a first interface for communicating among a plurality of concurrent computing resources in a concurrent computing environment;
accessing, using the computing device, a first interface using a binder for the process, where:
the binder has a first application binary interface that is equivalent to an application binary interface of the first interface,
the binder is automatically generated at compile time based on a plurality of function pointers extracted from a file of the first interface, and
the binder is linked to the first interface at runtime;
launching the process in the concurrent computing environment;
using the first interface to set up a first plurality of communication channels among the plurality of concurrent computing resources, the plurality of communication channels for use with the process;
terminating the use of the first interface after the process is launched without terminating the execution of the process;
receiving a selection of a second interface for communicating among the plurality of concurrent computing resources;
modifying the binder, at runtime, to point to the second interface so that the second interface is used instead of the first interface; and
using the second interface to set up a second plurality of communication channels among the plurality of concurrent resources.

7. The method of claim 6, wherein the first and second interfaces are two different implementations of a message passing interface.

8. A non-transitory computer-readable medium holding computer-executable instructions that when executed by a computing device cause a multi-threaded process on a computing device to access an un-shareable resource, said instructions comprising instructions for:
creating at compile time of the multi-threaded process, a binder for the multi-threaded process to access the un-shareable resource such that the binder includes an interface;
linking the interface of the binder to the un-shareable resource at runtime, wherein the interface of the un-shareable resource includes an application binary interface;
at the interface of the binder,
receiving a plurality of requests from a plurality of threads of the multi-threaded process to access an un-shareable resource, wherein the plurality of requests from the plurality of threads are made according to the application binary interface of the un-shareable resource;
selecting a first thread from the plurality of threads to service using the binder;
providing one or more input arguments of the first thread to the un-shareable resource using a function call;
preventing the plurality of threads besides the first thread from accessing the un-shareable resource when the first thread is accessing the un-shareable resource; and
providing a second application binary interface that is identical to the application binary interface of the un-shareable resource, wherein the plurality of requests from the plurality of threads are received by the second application binary interface.

9. The medium of claim 8, wherein at least two of the plurality of requests are made simultaneously by two different threads of the multi-threaded process.

10. The medium of claim 8, wherein the un-shareable resource is a library of a message passing interface (MPI) implementation.

11. The medium of claim 8, wherein the un-shareable resource can only be directly accessed by a specific thread.

12. The medium of claim 8 further comprising the instructions for:
placing the plurality of threads in a queue; and
servicing the plurality of threads in a first in first out order from the queue using the binder.

13. A non-transitory computer-readable medium holding computer-executable instructions when executed by a computing device causing the computing device to change an interface during execution of a process, said instructions comprising instructions for:
receiving a selection of a first interface for communicating among a plurality of concurrent computing resources in a concurrent computing environment;
accessing the first interface using a binder for the process, where:
the binder has a first application binary interface that is equivalent to an application binary interface of the first interface,
the binder is automatically generated at compile time based on a plurality of function pointers extracted from a file of the first interface, and
the binder is linked to the first interface at runtime;
launching a process in the concurrent computing environment; using the first interface to set up a first plurality of communication channels among the plurality of concurrent computing resources, the plurality of communication channels for use with the process;

terminating the use of the first interface after the process is launched without terminating the execution of the process;

receiving a selection of a second interface for communicating among the plurality of concurrent computing resources;

modifying the binder, at runtime, to point to the second interface so that the second interface is used instead of the first interface; and using the second interface to set up a second plurality of communication channels among the plurality of concurrent resources.

14. The medium of claim 13, wherein the first and second interfaces are two different implementations of a message passing interface.

* * * * *

UNITED STATES PATENT AND TRADEMARK OFFICE
CERTIFICATE OF CORRECTION

| | | |
|---|---|---|
| PATENT NO. | : 8,561,077 B1 | Page 1 of 1 |
| APPLICATION NO. | : 11/403113 | |
| DATED | : October 15, 2013 | |
| INVENTOR(S) | : Edric Ellis et al. | |

It is certified that error appears in the above-identified patent and that said Letters Patent is hereby corrected as shown below:

Title page, column 1, item (73) Assignee, change "Math Works" to --MathWorks-- (delete the space between "Math" and "Works")

In the Specification

Column 6, line 14, delete "would"

Column 10, lines 2-3, change "ordinarily" to --ordinary--

Signed and Sealed this
Twenty-first Day of October, 2014

Michelle K. Lee
*Deputy Director of the United States Patent and Trademark Office*